UNITED STATES PATENT OFFICE.

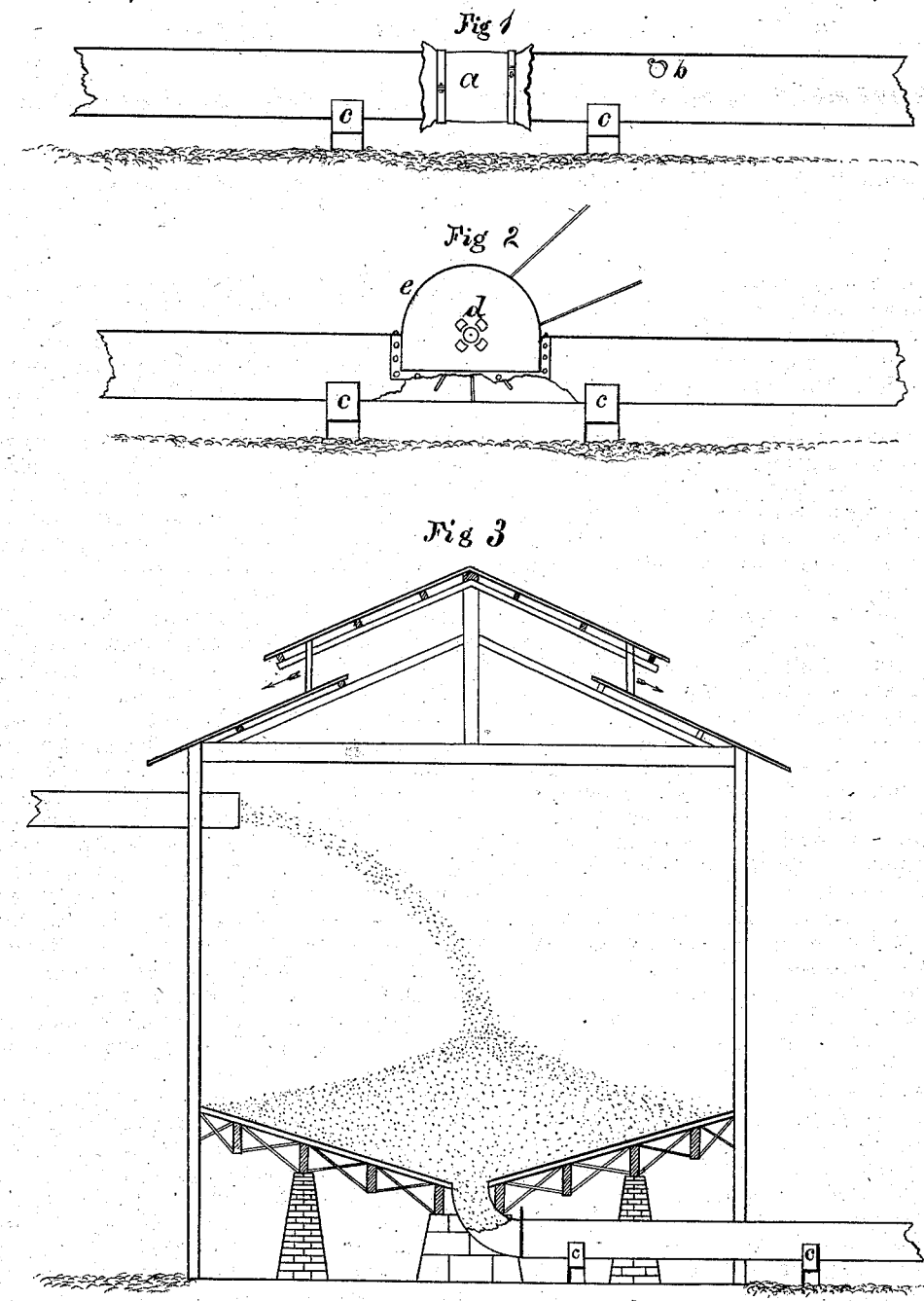

ROBERT M. CATLIN, OF BURLINGTON, VERMONT.

IMPROVEMENT IN MODES OF TRANSPORTING AND DRYING GRAIN.

Specification forming part of Letters Patent No. 155,708, dated October 6, 1874; application filed April 24, 1874.

*To all whom it may concern:*

Be it known that I, ROBERT M. CATLIN, of Burlington, Chittenden county, Vermont, have invented a Mode of Transporting and Drying Grain, of which the following is a specification:

This invention relates to a new and improved mode of conveying grain in bulk long distances and in large quantities, quicker, cheaper, and in better condition than by any other method heretofore adopted, drying the grain and fitting it for immediate use or shipment with safety at any season.

I am aware that pneumatic tubes have long been used for moving grain in bulk in limited quantities short distances, as in grain-elevators and warehouses, and to this extent I make no claim; but what I do claim as my improvement is the use of a pneumatic tube that will convey grain in bulk in large quantities long distances, quicker, cheaper, and safer than can be done by any process that has been or is now in use, and by drying the grain suitable for any purpose of storing, grinding, or shipping at any season.

The transportation of grain in bulk in large quantities and for long distances involves difficulties and conditions not incident to the transporting of the same in limited quantities short distances. These difficulties and conditions I overcome by my improvement, so as to receive in Chicago and deliver in New York grain in bulk in much less time, and at greatly-reduced cost, and in much better condition, than is now or ever has been accomplished.

I use a tube of metal or other material that will admit of economical use, and possessing strength enough to resist the pressure of air necessary for quick transit. Compressed air is introduced with sufficient force to move the grain at the speed required. The grain, falling on this column of moving air, is carried forward by this force until the force and speed are diminished by friction and escape of air. When this occurs new and fresh air is introduced to supply the loss with force sufficient to accelerate the motion and maintain the speed, Fig. 2. The waste of power by leakage of air will be great unless provision is made for the expansion and contraction of the tube under varying conditions of temperature. To meet this contingency, I construct my tube in sections having air-tight flexible joints, Fig. 1, letter *a*, uniting them so as to admit the movement due to the expansion and contraction, as well as to frost or any other circumstances. The tube is placed on the surface of the ground and is supported on sleepers suitably arranged to hold the tube in position, Figs. 1 and 2, letter C. At suitable locations along the line I provide receiving-stations of suitable capacity to receive such quantity of grain as may be deemed necessary to discharge from the tube in case of accidents, and for the purpose of exchanging the damp for dry air, together with suitable arrangements for holding the grain any desired time and for starting it forward again on its way when desired, Fig. 3. The grain, when admitted into the tube, will be more or less moist, which moisture will be liberated into the air by action of the heat arising from pressure and friction. This air, when saturated and hot, must be exhausted, which may be gradually done through the exhaust-ports, Fig. 2, letter *b*, along the line, or by discharging it into the receiving-stations above mentioned, shown in Fig. 3. The tube, being placed on the surface of the ground, may follow its elevations and depressions, and when elevations are to be overcome requiring more force to keep up the speed, increased power can be supplied to accelerate the motion, Fig. 2.

Tubes used in conveying long distances have been placed beneath the surface of the ground. I claim the use of a tube for the purpose of conveying grain placed on the surface of the ground or above it. This is an improvement over the old modes of constructing such tubes below the surface, as it admits of ready access for the purpose of examination and repair, and saves large expense in construction.

This is a new improvement, producing a new result of great importance, which never has been or could be produced by the use of any pneumatic tube ever constructed without attaching thereto that which I employ, or an equivalent.

The object and purpose aimed at are different from former methods. Those which have been used are limited in capacity and purpose, reaching only to the interest and convenience of the user, as the extent and purpose for which it has been used fully proves. The tube I propose has a capacity and purpose affecting the interest of every individual in the community, for all are consumers or producers of grain.

I therefore desire Letters Patent to secure me the benefits of my improvement, as herein specified.

Figure 1 represents a pneumatic tube lying on the surface of the ground supported by sleepers $c$, showing the flexible air-tight joint $a$ with an exhaust-port $b$. Fig. 2 represents a device, $e$, inserted in the tube for the purpose of accelerating the motion, which forces air into the tube to supply waste. $d$ is the opening through which this air is drawn. Fig. 3 represents the receiving-station, into which the grain is introduced for the purpose of discharging the damp or heated air, or for holding or storing for any purpose, with conveniences for drawing it into the tube for forwarding it on its way.

I claim—

An apparatus for conveying and drying grain, consisting of a series of tubes laid upon the ground and united by elastic joints, said tube discharging at suitable intervals into chambers in which the foul and damp air is removed and dry air substituted, and being also connected at proper distances with machines for supplying compressed air to the interior of the tube, all as and for the purposes specified.

ROBERT M. CATLIN.

Witnesses:
   H. W. CATLIN,
   W. M. CATLIN.